United States Patent

[11] 3,598,325

| [72] | Inventor | Cornelis van der Lely<br>Bruschenrain 7, Zug, Switzerland |
|---|---|---|
| [21] | Appl. No. | 861,516 |
| [22] | Filed | Sept. 26, 1969 |
| [45] | Patented | Aug. 10, 1971<br>Continuation of application Ser. No.<br>609,880, Jan. 17, 1967, now abandoned. |

[54] IMPLEMENTS FOR THE SPREADING OF MATERIALS OVER THE GROUND
11 Claims, 4 Drawing Figs.

[52] U.S. Cl. .................................................. 239/665, 239/675
[51] Int. Cl. .................................................. A01c 17/00
[50] Field of Search ....................................... 239/665, 668, 681, 687, 650, 689, 675

[56] References Cited
UNITED STATES PATENTS

| Re. 19,801 | 12/1935 | Mosgrove | 239/675 |
| Re. 25,713 | 1/1965 | Tyler | 239/665 |
| 2,234,343 | 3/1941 | Harrington | 239/665 |
| 2,526,081 | 10/1950 | Meincke | 239/684 |
| 2,626,809 | 1/1953 | Ferguson | 239/675 |
| 2,699,337 | 1/1955 | Best | 239/677 |
| 3,218,083 | 11/1965 | van der Lely et al | 239/687 X |
| 3,220,740 | 11/1965 | Kavan et al | 239/677 |
| 3,298,696 | 1/1967 | Vissers | 239/689 |

*Primary Examiner*—Lloyd L. King
*Attorney*—Mason, Mason & Albright

ABSTRACT: This invention relates to implements for the spreading of materials over the ground, such implements being of the kind comprising a frame supported by rotatable ground wheels, a hopper or other container for material to be spread and a distributor rotatable about a substantially vertical axis.

The distributor is located beneath the hopper but above the wheels so that material can be spread unimpeded laterally of the implement. An agitator in the hopper can be adjusted to move varying amounts of material towards the distributor. The distributor can be adjusted to vary the amount and direction of the material being spread.

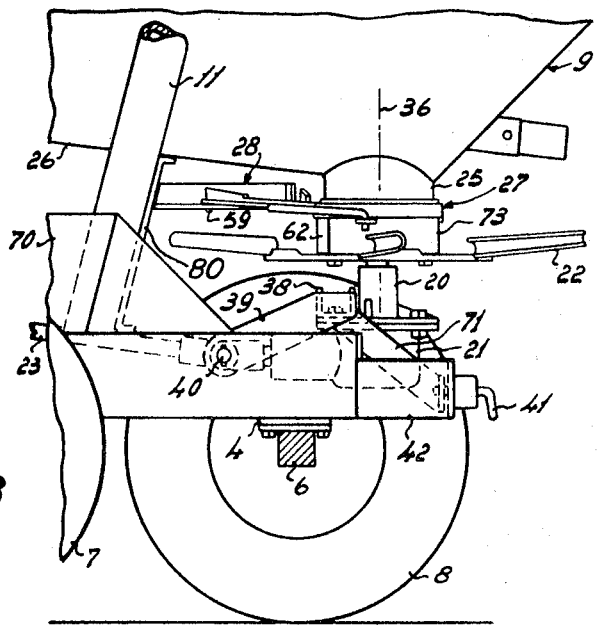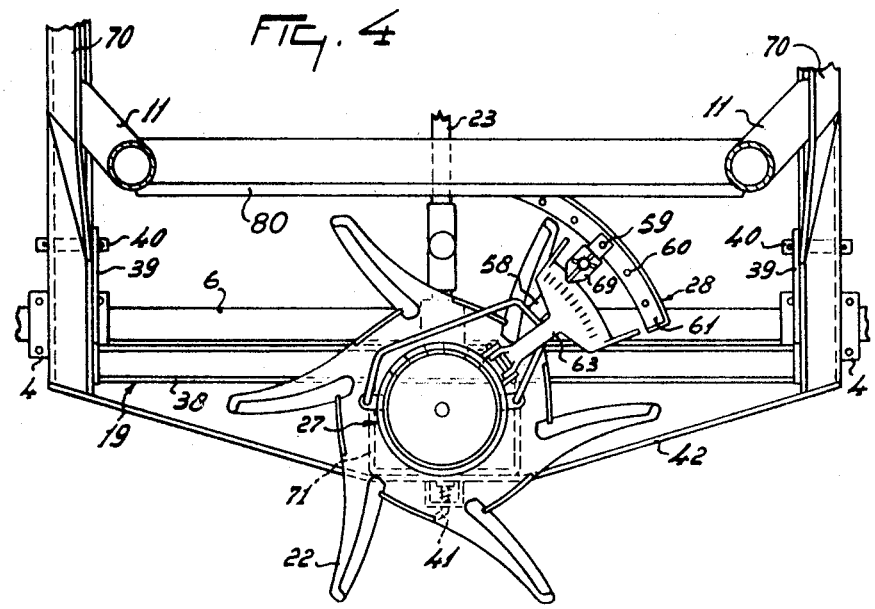

IMPLEMENTS FOR THE SPREADING OF MATERIALS OVER THE GROUND

This application is a continuation of application Ser. No. 609,880 filed Jan. 17, 1967, now abandoned.

An object of the invention is the provision of a simple and effective implement that can have a large capacity hopper.

According to the invention, there is provided an implement of the kind set forth, wherein the distributor is located wholly or mainly above a horizontal plane containing the uppermost extremities of said ground wheels, the hopper having an elongated shape whose length extends generally parallel to the intended direction of operative travel of the implement.

Figure 1:
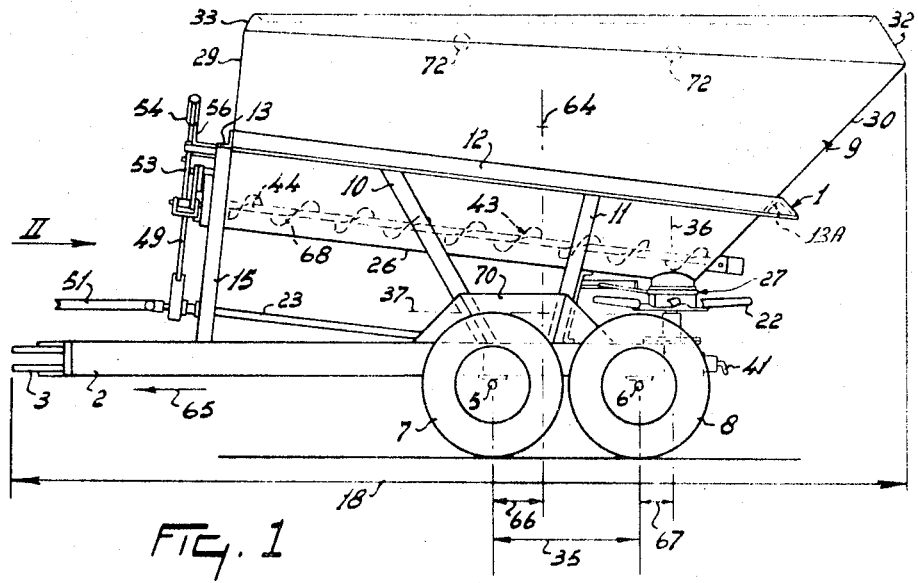
Figure 2:
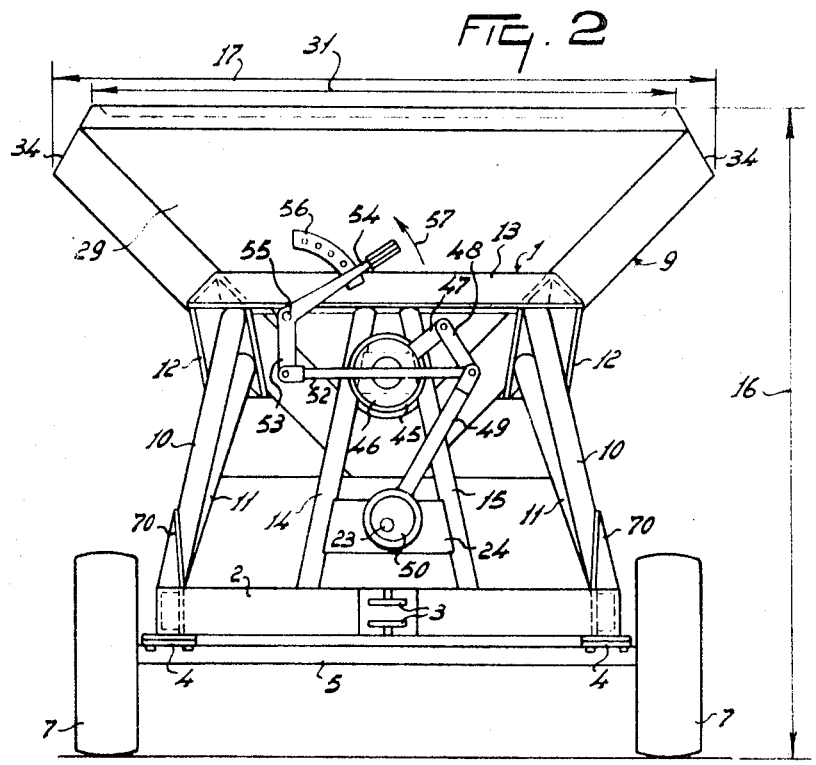

For a better understanding of the invention, and to show how the same may be carried into effect, reference will now be made, by way of example, to the accompanying drawings, in which:

FIG. 1 is a side elevation of a spreading implement in accordance with the invention, FIG. 2 is a front elevation as seen in the direction indicated by the arrow II of FIG. 1, FIG. 3 is a scrap side elevation showing certain parts that can be seen in FIG. 1 to an enlarged scale and in greater detail, and FIG. 4 is a plan view generally corresponding to FIG. 3 but omitting an upper part of the implement.

Referring to the drawings, the implement which is illustrated has a frame 1 that includes two substantially horizontally disposed beams 2 of channel-shaped cross section. Each beam 2 has a flat plate interconnecting the free ends of the limbs of its channel-shaped cross section so that each beam 2, together with the corresponding plate, forms a cylinder of rectangular cross section. As can be seen in FIGS. 1 and 2 of the drawings, the beams 2 afford a lower part of the frame of the implement and converge towards one another in the intended direction of its operative travel which is indicated by an arrow 65 in FIG. 1 of the drawings. A coupling member 3 which can be hitched to, for example, the tow-bar of an agricultural tractor, is mounted at the leading end of the implement at the junction between the two convergent beams 2. The rear ends of the two beams 2 extend substantially parallel to one another and are provided at their lower sides with four supports 4 to which two relatively parallel substantially horizontal axles 5 and 6 are fixed so as to extend perpendicular to the direction 65. The front axle 5 has two ground wheels 7 rotatably mounted at its opposite ends and, similarly, the rear axle 6 has two ground wheels 8 rotatably mounted at its opposite ends, all the wheels 7 and 8 being of the same size.

The frame 1 supports a hopper 9 for powdered or granular material which is to be spread over the surface of the ground, i.e. material such as artificial fertilizer, lime, grit, sand, seeds or the like. Two beams 10 have their lowermost ends secured to the two beams 2 adjacent the ground wheels 7 and converge upwardly and forwardly, relative to the direction 65, from said ends. Two further beams 11 have their lowermost ends secured to the two beams 2 close to the ground wheels 7 at a location approximately midway between the axles 5 and 6, the further beams 11 converging upwardly and rearwardly, relative to the direction 65, from said ends. A connecting plate member 80 bridges support beams 11 and contacts the bottom of hopper 9 as shown in FIGS. 3 and 4. The uppermost ends of the beams 10 and 11 are secured to two supporting beams 12 that extend longitudinally of the implement on relatively opposite sides of the hopper 9. The connections between the lower ends of the beams 10 and 11 and the beams 2 are reinforced by plates 70 that are welded or otherwise rigidly secured to the various beams. A transverse supporting beam 13 rigidly interconnects the leading ends of the two supporting beams 12 and a similar transverse supporting beam 13A rigidly interconnects the rearmost ends of the beams 12. The leading transverse supporting beam 13 is directly connected to the two beams 2 by beams 14 and 15 that converge upwardly and rearwardly from the beams 2, their uppermost ends being spaced apart from one another by a short distance longitudinally of the supporting beam 13.

The overall height 16 (FIG. 2) of the implement is about 1.90 meters. The hopper 9 is at its maximum width 17 at its rearmost end, said width 17 being about 2.10 meters. The overall length 18 (FIG. 1) of the implement is about 2.50 meters. The capacity of the hopper 9 is such that it can carry about 4,000 kilograms of a material such as granular artificial fertilizer. A supporting member 19 (FIG. 4) extends transversely between the two frame beams 2 at the rearmost ends of those beams, the member 19 supporting a gearbox 21 that has a substantially vertical bearing 20 on its upper side to afford the substantially vertical axis of rotation 36 of an output shaft of said gearbox which drives a rotary distributor 22. The substantially horizontally disposed and forwardly projecting input shaft of the gearbox 21 is connected by a universal joint to a transmission shaft 23 whose leading end is journaled in a bearing carried by a support 24 rigidly interconnecting the beams 14 and 15. As can be seen best in FIG. 3 of the drawings, the rotary distributor 22 is located beneath a cylindrical outlet spout 25 of the hopper 9, the spout 25 being disposed at the lowermost and rearmost end of the downwardly and rearwardly inclined bottom 26 of said hopper. The longitudinal axis of the cylindrically shaped spout 25 substantially coincides with the substantially vertical axis of rotation 36 of the rotary distributor 22.

Control mechanism which is generally indicated by the reference numeral 27 is interposed between the spout 25 and the rotary distributor 22, the mechanism 27 being adapted to set the position in which material from the hopper 9 falls to the ground relative to the path of travel of the implement and also the volume of material per unit time which is fed to the rotary distributor 22. The control mechanism 27 includes an annulus 73 whose upper end surrounds the spout 25 and whose lowermost edge bears against the uppermost surface of the rotary distributor 22, the annulus 73 being formed with three outlet ports through which material from the hopper 9 can reach the distributor 22. The whole annulus 73 is angularly adjustable about the axis 36 with the aid of an arm 58 carrying a bent rod which is linked to lugs projecting from the annulus. The end of the arm 58 remote from the annulus 73 carries a downwardly projecting pin 59 that can be entered in any one of a curved row of holes 60 formed in an adjusting member 28 which is afforded by a curved strip 61. The center of curvature of the strip 61 is, of course, substantially coincident with the axis 36. The angular settings of the outlet ports in the annulus 73 about the axis 36 can be changed by engaging the pin 59 in different ones of the holes 60 with a consequent change in the position of the strip of ground upon which material ejected from the distributor 22 falls with respect to the path of travel of the whole implement. The annulus 73 is surrounded by a masking member 62 afforded by a ring carrying shutter plates that cooperate with the outlet ports in the annulus to vary the effective open areas of those outlet ports between "fully closed" and "fully open" settings. The masking member 62 is angularly adjustable about the axis 36 both together with, and relative to, the annulus 73 with the aid of a projecting arm 63 that is supported from beneath by the arm 58. A clamp 69 is carried by the arm 58, said clamp incorporating a pointer which cooperates with a scale marked on the arm 63 to show the extent to which the outlet ports in the annulus 73 are open. The clamp 69 can be tightened to temporarily secure the arm 63 in any chosen setting relative to the arm 58. It will be evident that the chosen setting of the arm 63 relative to the arm 58 determines the effective cross-sectional areas of the outlet ports in the annulus 73 and thus the volume of material per unit time which reaches the distributor 22 through said outlet ports during use of the implement.

As previously mentioned, the bottom 26 of the hopper 9 is inclined gently downwardly from front to rear when the implement occupies a normal working position. The front 29 of the hopper is perpendicularly inclined to the length of the bottom 26 while its rear wall 30 is inclined upwardly and rearwardly, relative to the direction 65, from the spout 25 at an angle of about 45° to the horizontal. The side walls of the hopper a converge gently from the rear to front of the hopper so that its width 31 at its leading end is a little less than the width 17 at its rear end. The uppermost edge 32 of the rear wall 30 of the hopper 9 is bent over inwardly, said edge 32 being larger than a similarly bent over edge 33 of the front 29 of the hopper. The side walls of the hopper 9 also have upper inwardly bent over edges 34 which are of the same size as the edge 32 at their rearmost ends and the same size as the edge 33 at their leading ends. Thus, the edges 34 taper gently from the rear to the front of the hopper 9.

The hopper 9 is mounted on the frame 1 in such a way that a vertical plane 64 that extends perpendicular to the direction 65 and that contains the center of gravity of the hopper is located to the rear, relative to the direction 65, of the front axle 5. The perpendicular distance 66 (FIG. 1) between the plane 64 and the relatively parallel axle 5 is less than the radius of one of the ground wheels 7 and it is preferred that it should always be less than twice the radius of one of said ground wheels. The axles 5 and 6 are spaced apart by a perpendicular distance 35 which is less than one-and-a-half times the diameter of one of the ground wheels 7. The axis of rotation 36 of the distributor 22 is located to the rear, relative to the direction 65, of the rear axle 6 at a perpendicular distance 67 from that axle which is less than the radius of one of the ground wheels 8 and is preferably not greater than said radius. The distributor 22 itself is located wholly or mainly above a substantially horizontal plane 37 which contains the uppermost extremities of all four of the ground wheels 7 and 8.

The supporting member 19 of the gearbox 21 and distributor 22 includes a beam 38 that extends horizontally perpendicular to the direction 65, said beam 38 being carried by two arms 39 that are turnably connected to the two beams 2 aligned horizontal pivot pins 40. A bracket 71 projects downwardly and rearwardly from a central region of the beam 38 and is arranged to be retained in place, to prevent the supporting member 19 from turning about the pivot pins 40, by a spring-loaded horizontal locking pin 41 carried centrally of a profiled strip 42 that interconnects the extreme rear ends of the two beams 2.

An agitator 43 is mounted internally of the hopper 9, said agitator comprising a central rectilinear shaft 44 to which conveying members in the form of Archimedean screw blades 68 are secured. The shaft 44 is connected by means of an overload clutch 45 (i.e. a clutch which will slip when the resistance to rotation of its output member exceeds a predetermined value) to a one-way mechanism 46 (i.e. a pawl and ratchet assembly, sprag clutch or the like). The input member of the mechanism 46 comprises a projecting arm 47 whose free end is pivotally connected to one end of a link 48. The opposite end of the link 48 is pivotally connected to the upper free end of an arm 49 whose lowermost end carries a ring arranged around an eccentric 50 fastened to the transmission shaft 23. The leading end of the transmission shaft 23 is adapted to be connected by a universal joint to the rear end of a telescopic or other transmission shaft 51 whose leading end can be placed in driven connection with the power takeoff shaft of an agricultural tractor or other vehicle which is used to tow and power the implement during the use of the latter. The pivot pin affording the connection between the link 48 and the arm 49 also has one end of a rod 52 turnably mounted on it. The opposite end of the rod 52 is pivotally connected to the lowermost free end of one arm 53 of an angular lever 54 whose fulcrum is afforded by a shaft 55 secured to the frame 1. As can be seen in the drawings, the upper arm of the lever 54 is slidable along a quadrant 56 fastened to the transverse supporting beam 13 of the frame 1, said quadrant being formed with means such as holes adapted to cooperate with means such as a pin on the lever 54 to enable said lever to be retained in chosen angular settings about the shaft 55. The arms 47 and 49 and the link 48 form reciprocatory and oscillatory transmission members for drive to the agitator 43. The transmission members which have just been mentioned drive the agitator 43 by way of the clutch 45 and one-way mechanism 46, the driving energy being derived from rotation of the shafts 51 and 23. The rod 52 and angular lever 54 constitute adjusting mechanism by which the drive to the agitator 43 in response to rotation of the shaft 51 can be varied.

In the use of the implement which has been described in spreading, for example, granular artificial fertilizer, the coupling member 3 is hitched to the tow-bar or the like of an agricultural tractor or other towing and operating vehicle and the leading end of the transmission shaft 51 is placed in driven connection with the power takeoff shaft of the same tractor or other vehicle. The rotary distributor 22 is caused to rotate about the axis 36 by way of the shaft 51, the shaft 23 and the transmission members within the gearbox 21. The control mechanism 27 is adjusted, in the manner which has been described previously, to provide the required rate of delivery of the material per unit time to the distributor 22 and to ensure that material which is spread by the blades of the distributor 22 falls to the ground in the desired area relative to the path of travel of the implement. The supply of material from the hopper 9 to the distributor 22 is affected by the agitator 43. The agitator 43 is caused to rotate slowly in such a direction that the blades 68 move the material in the hopper 9 along its bottom 26 towards the spout 25. The eccentric 50 produces a reciprocatory motion of the arm 49 and this motion is translated by the link 48, the arm 47, the one-way mechanism 46 and the overloaded clutch 45 into step-by-step rotation of the shaft 44. The one-way mechanism 46 is so arranged that motion of the arm 47 in the direction 57 (FIG. 2) is "lost-motion" which will not move the shaft 44 while movement of the arm 47 in a direction opposite to the direction 57 does rotate the arm 44 in a corresponding direction. As previously mentioned, the overload clutch 45 is so arranged that it will slip when a predetermined resistance to rotation of its output member (with which the shaft 44 is substantially rigid) is exceeded. This state of affairs will exist if a large amount of material is already in position for passage through the spout 25 and when the rate of delivery to the distributor 22 set by the masking member 62 is less than the rate at which the agitator 43 is tending to deliver fresh material to the upper end of the spout 25. Thus, if the rate of delivery of the agitator 43 is too great for the setting of the masking member 62, the overload clutch 45 will slip periodically so that the agitator 43 will only be driven intermittently thus reducing the rate of flow of material to the spout 25 which it produces to the rate of flow dictated by the setting of the masking member 62.

The position of the pivotal connection between the arm 49 and the link 48 can be changed by varying the position of the upper arm of the angular lever 54 along the quadrant 56. It will be apparent from FIG. 2 of the drawings that the amplitude of oscillation of the arm 47 is variable between a minimum and a maximum, the particular amplitude at any given time being dependent upon the setting of the angular lever 54. The extent of rotation of the shaft 44 in response to each rotation of the shaft 23 is thus also dependent upon the setting of the angular lever 54 and, therefore, when a relatively small volume of material per unit time is to be spread by the distributor 22, the angular lever 54 is set to give the minimum, or a low, amplitude of oscillation of the lever 47. The availability of this control ensures that it will not always be necessary for the overload clutch 45 to slip to avoid excessive delivery of material to the region of the hopper 9 immediately above the spout 25. If such excessive delivery could be avoided only by slipping of the overload clutch 45, then the material in the hopper 9 might frequently be subjected to considerable pressure by the agitator 43, particularly when only small quantities of material per unit time were being spread. This could adversely affect the material by pulverizing granular materials to an excessive extent and might also cause caking and bridging of the material at the upper end of the outlet spout 25. The overloaded clutch 45 is principally intended to operate only when large lumps or other accumulations of material are met with and when the control mechanism 27 is passing an insufficient flow of material to the distributor 22, for example, when the outlet ports in the annulus 73 are completely closed for short periods during which the shaft 23 is still rotating. It is most unusual for the outlet spout 25 to become clogged by lumps since the frictional rubbing effect which the agitator 43 produces upon such lumps is usually capable of rapidly breaking them up to a fine condition.

The arrangement of the agitator 22 wholly or mainly at a level above the uppermost extremities of the wheels 7 and 8 and the arrangement of its axis of rotation 36 to the rear of the rear axle 6 results in an advantageous position of the rotary distributor 22 which is such that it can eject material to one or other side, or to both sides, of the implement over the tops of the rear ground wheels 8. The disposition of the ground wheels 7 and 8 and the dimensions of the frame 1 and hopper 9 are such that a stable equilibrium of the implement is produced without much upward or downward loading pressure at the coupling member 3. The hopper 9 is shaped in such a way that the whole of its load can be emptied through the spout 25 when required. Although the hopper 9 is of large capacity, it need not be of excessive weight since stability of its shape is considerably assisted by the provision of the inwardly bent over edges 32, 33 and 34 and by the provision of two transverse bars 72 (FIG. 1) which extend between its side walls at the junctions between the major parts of those side walls and their bent over edges 34.

When the implement is to be cleaned, the control mechanism 27 can be removed by releasing the locking pin 41 and turning the supporting member 19 downwardly about the pivot pins 40. The distributor 22 is thus lowered away from the outlet spout 25 whereafter the control mechanism 27 can be lifted away from the rotary distributor 22. The locking pin 41 normally acts to maintain the distributor 22 in its operative position.

Though the implement described is suitable for spreading powdered or granular the construction according to the invention can also be used for an implement for spreading liquids. In this last-mentioned case the container can be made suitable for liquids, whereas the control mechanism 27 can be replaced by other means for controlling the delivery of liquid to the spreader 22.

What I claim is:

1. An implement for spreading material over the ground comprising a frame, a hopper for material to be spread and a distributor, an agitator located in said hopper, said agitator being connected to a driver mechanism through the intermediary of an adjusting mechanism, said adjusting mechanism including transmission means having pivoted arms and a one-way mechanism, one of said arms being connected to said driving mechanism and a second of said arms being connected to said agitator, said adjusting mechanism having a turnably mounted angular lever pivotally connected to a junction between two of said arms, said angular lever being provided with retaining means for holding said lever in a plurality of different settings about its fulcrum.

2. An implement for spreading material over the ground comprising a frame, a hopper for the material to be spread and a distributor, an agitator located in said hopper, said agitator having a shaft, a one-way mechanism connected to said shaft and transmission means having pivoted arms arranged between said one-way mechanism and a driving mechanism, said arms extending transverse to the length of said shaft, an adjusting mechanism coupled with said transmission means to a junction between two of said arms, whereby the position of said junction can be displaced, said adjusting mechanism including operating means and a retaining means for holding the chosen setting of operating means in any one of a plurality of different settings.

3. An implement as claimed in claim 2 wherein an overload clutch is interposed between said one-way mechanism and said agitator, said overload clutch being responsive to slip when a predetermined resistance to rotation of said agitator is exceeded.

4. An implement for spreading material over the ground comprising a frame, a hopper for the material to be spread and a distributor, a turntable agitator located in said hopper to extend along the bottom thereof, said agitator being connected with a driving mechanism through the intermediary of transmission means including pivoted arms and a one-way mechanism, an adjusting mechanism coupled to said transmission means at the implement's front end, said adjusting mechanism having a lever connected through pivotal means to at least one of said arms, said lever being provided with retaining means for holding said lever in a plurality of different settings about its fulcrum whereby the amount said agitator is turned by said driving mechanism can be varied by moving said lever.

5. An implement for spreading material over the ground comprising a frame, a hopper for the material to be spread and a distributor, said frame having a horizontal frame part including two frame beams the front ends of which converge towards each other, the front end of said horizontal frame part having coupling means for connection to a prime mover, two pairs of ground wheels each with horizontal axle shafts connected to said frame part to support said implement, said axle shafts being spaced from one another a distance not greater than one-and-a-half the diameter of said wheels, a substantially vertical shaft connected to said distributor to rotate same, said shaft being located to the rear of said axle shafts and carried in a gear box case mounted on a further shaft which extends transverse to the direction of travel within said horizontal frame part, an input shaft in the front end of said gear box and a transmission shaft connected to said gear box, the front end of said transmission shaft connected to the power takeoff shaft of the prime mover, said hopper resting on support means including two supporting beams on each side of said hopper which extend upwardly from said horizontal frame part to said hopper, said hopper having a bottom part extending downwardly from its front end to its rear end, the rear end of said hopper being provided with an outlet opening above said distributor, the rear side of said hopper extending from said outlet opening upwardly and rearwardly, the upper sides of said hopper being provided around its circumference with rims extending obliquely inwardly and upwardly, agitating means being provided at the bottom of said hopper and said agitating means including a horizontal shaft coupled with a transmission which is also coupled with said transmission shaft.

6. An implement for spreading material over the ground comprising a frame, a hopper for the material to be spread and a distributor rotatable about a substantially vertical axis, said rotatable distributor adjoining an outlet provided at the rear end of the bottom of said hopper and said bottom being inclined downwardly from its front to its rear when the implement is standing on level ground, two pairs of ground wheels supporting said implement whereby, as seen in side elevation of the implement, the axis of rotation of said distributor is located behind the axes of rotation of said two pairs of ground wheels and the axis of rotation of one of said pair of ground wheels being located in front of the axis of rotation of the other of said pair of ground wheels, and the center of gravity of said hopper being located between said two pairs of ground wheels, the axes of rotation of said pairs of ground wheels being spaced apart from each other by a horizontal distance which is not greater than one-and-a-half times the diameter of one of the ground wheels, said frame having a horizontal frame part including two frame beams, said hopper resting on support means extending upwardly from said horizontal frame part to said hopper, said support means being located at opposite sides of the hopper, each of said support means having beam means on the front and rear side thereof and said beam means being reinforced by plate means connected therebetween at the outer side of the implement, said hopper having sloping walls with upper rims extending upwardly and inwardly towards the center of said hopper.

7. An implement for spreading material over the ground comprising a frame, a hopper for the material to be spread and a distributor, said frame having a horizontal frame part, a connecting member attached to said frame part for coupling said implement to a prime mover, two shafts being connected to the horizontal frame part and said shafts extending transversely to the intended direction of travel, one in front of the other, ground wheels on the ends of said shafts with the distance between said shafts being less than one-and-a-half the diameter of the wheels, said distributor being rotatable about a substantially vertical axis, said axis being located behind said shafts, said horizontal frame part having upstanding supports for bearing said hopper, said hopper having a bottom part sloping downward from its front end to an outlet at the rear end in the bottom part of the hopper above said distributor, the walls of said hopper all having upper rims extending inwardly and upwardly towards the center of said hopper, the rim at the upper end of the rear wall being larger than the rim at the front side of the hopper.

8. An implement for spreading material over the ground comprising a frame, a hopper for the material to be spread and a distributor, said frame having a horizontal frame part and the front end of said frame part having a connecting member for coupling said implement to a prime mover, two adjacent pairs of ground wheels supporting said implement, each of said pairs of ground wheels mounted on a horizontal shaft, one behind the other, said shafts being connected to said frame below the rear portion of said hopper, said distributor being rotatable about a substantially vertical axis and said axis located behind said shafts along the longitudinal axis of said implement, said horizontal frame part having spaced apart upstanding supports, the upper ends of which bear on the opposite sides of said hopper, said upstanding supports having beam means on the front and rear side thereof and said beam means being reinforced by plate means connected therebetween at the outer sides of the implement, said hopper having a bottom part sloping downward from its front end to terminate in an outlet at the rear of said hopper above the said distributor, the upper sides of said hopper all having rims extending obliquely inwardly towards one another and the center of gravity of said hopper being located in a vertical plane between the ground wheel shafts.

9. The implement of claim 8 wherein said upstanding supports are bridged by a connecting plate means which contacts the bottom of said hopper.

10. An implement for spreading material over the ground comprising a frame, a hopper for the material to be spread and a distributor, two pairs of ground wheels supporting said implement, each of said pairs of ground wheels mounted on a horizontal shaft, one behind the other said shafts being connected to said frame, the center of gravity of said hopper being located in a vertical plane extending transverse to the direction of travel between said two shafts, a substantially vertical axle rotatably supporting said distributor positioned behind said shafts, said hopper having opposite sloping walls and transverse bars connecting the opposite sidewalls of the hopper, said distributor being positioned at least partly below the bottom of said hopper, said vertical axle being journaled a gear box and said gear box including a horizontal driving shaft, said horizontal driving shaft extending forwardly from said gear box with coupling means for connection to the power takeoff shaft to a prime mover through the intermediary of a driving shaft, a coupling member at the front of said frame for connection to the prime mover, agitating means positioned near the bottom of said hopper, said agitating means being coupled with pivoted arm means driven from said takeoff shaft, said hopper having a bottom inclined downwardly from its front to its rear and an outlet being provided near the rear end of said hopper above said distributor.

11. An implement for spreading material over the ground comprising a frame, a hopper for the material to be spread and a distributor, said frame having a horizontal frame part including two frame beams the front ends of which converge towards each other, the front end of said horizontal frame part having coupling means for connection to a prime mover, two pairs of ground wheels each with horizontal axle shafts connected to said frame part to support said implement, said axle shafts being spaced from one another a distance not greater than one-and-a-half the diameter of said wheels, a substantially vertical shaft connected to said distributor to rotate same, said shaft being located to the rear of said axle shafts and carried in a gear box case mounted on a further shaft which extends transverse to the direction of travel within said horizontal frame part, an input shaft in the front end of said gear box and a transmission shaft connected to said gear box, the front end of said transmission shaft connected to the power takeoff shaft of the prime mover, said hopper resting on support means which extends upwardly from said horizontal frame part to said hopper, said support means being located at opposite sides of the hopper, said hopper having a bottom part extending downwardly from its front end to its rear end, the rear end of said hopper being provided with an outlet opening above said distributor, the rear side of said hopper extending from said outlet opening upwardly and rearwardly, the upper sides of said hopper being provided around its circumference with rims extending obliquely inwardly and upwardly, the rim at the upper end of the rear wall of the hopper being larger than the rim at the front side of the hopper.